US006481350B2

(12) United States Patent
Oehara et al.

(10) Patent No.: US 6,481,350 B2
(45) Date of Patent: Nov. 19, 2002

(54) SELF-CLEANING WEB-THREADING APPARATUS FOR A WEB-FED PRINTING PRESS

(75) Inventors: Masayuki Oehara, Kanagawa (JP); Kunio Suzuki, Kanagawa (JP)

(73) Assignee: Kabushiki Kaisha Tokyo Kikai Seisakusho, Tokyo (JP)

( * ) Notice: Subject to any disclaimer, the term of this patent is extended or adjusted under 35 U.S.C. 154(b) by 0 days.

(21) Appl. No.: 09/910,844

(22) Filed: Jul. 24, 2001

(65) Prior Publication Data

US 2002/0023564 A1 Feb. 28, 2002

(30) Foreign Application Priority Data

Aug. 30, 2000 (JP) ....................................... 2000-260207

(51) Int. Cl.[7] ........................... B41F 35/00; B08B 7/00; B32B 3/00

(52) U.S. Cl. ........................... 101/423; 101/424; 134/9; 156/64

(58) Field of Search ................................. 101/225, 228, 101/423, 424, 425, 232; 134/6, 9; 156/64

(56) References Cited

U.S. PATENT DOCUMENTS 5,275,673 A * 1/1994 Suzuki et al. ................. 156/64

FOREIGN PATENT DOCUMENTS

| | | | |
|---|---|---|---|
| DE | 197 39 045 A1 | 3/1999 | ........... B41F/35/00 |
| JP | 7-2051 | 1/1995 | ........... B41F/19/06 |

* cited by examiner

*Primary Examiner*—John Barlow
*Assistant Examiner*—Alfred E Dudding
(74) *Attorney, Agent, or Firm*—Rader, Fishman & Grauer, PLLC

(57) ABSTRACT

A self-cleaning web-threading apparatus for a web-fed printing press includes guide rails, a web leader, driver and a detergent supply. The guide rails define a web guideway along which a web is to be threaded through a printing press. The web leader travels along the web guideway in sliding engagement with the guide rails for threading the web through the press. The web leader is fabricated at least partially from a detergent-absorbent material for sliding contact with the guide rails. The driver drives the web leader along the web guideway. The detergent supply is disposed in a selected position on the web guideway for supplying a detergent to the web leader traveling along the web guideway to impregnate it with the detergent. The guide rails are cleaned by the detergent-impregnated web leader as it travels in sliding contact therewith.

10 Claims, 4 Drawing Sheets

SELF-CLEANING WEB-THREADING APPARATUS FOR A WEB-FED PRINTING PRESS

BACKGROUND OF THE INVENTION

1. Field of the Invention

This invention relates to printing presses, to web-fed printing presses, and to means in such machines for threading a continuous web of paper or like printable material along any desired path through the printing and other processing stations of the machine preparatory to printing on the web. More particularly, the invention deals with such web-threading means equipped with self-cleaning facilities.

2. Description of the Prior Art

Large printing presses, those having a plurality of printing stations and post-printing processing stations for newspaper production, for instance, are usually furnished with a set of alternative web guideways providing for as many different paths along which the web may be threaded for specific printing assignments. Each web guideway is defined by a pair of spaced guide rails on each side of the web path. The web being threaded has its leading end pasted to a pair of web leaders of a plastic or like flexible material, which are slidably received one between each pair of spaced guide rails.

Each pair of guide rails are not continuous but are divided into sections, each less in length than the web leaders, which are longitudinally spaced one from another to accommodate pairs of opposed drive rollers. Frictionally engaged between each pair of drive rollers, the web leaders travel down a chosen guideway to lead the web, being unwound from its roll in the supply station, along the guideway.

One of the problems with such web-threading means has been how to clean the pairs of spaced guide rails and of drive rollers to assure smooth travel of the web leaders. The guide rails and drive rollers are very susceptible to the accumulation of solids, especially in the neighborhoods of the printing rollers, due to the higher concentrations there of ink mist intermingled with paper fibers and particles.

The staining of the drive rollers with ink mist is particularly objectionable because the web leaders are easy to slip over the stained drive rollers. The possible results of such web leader slippage have been the slackening of the web, the entanglement of the slackened web with the neighboring parts, and the ultimate breakage of the web. Manual cleaning of the guide rails and drive rollers is of course very troublesome and time-consuming, adding much to the downtime of the machine.

Japanese Unexamined Utility Model Publication No. 7-2051 teaches how to clean the guide rails. It suggests use of what might be described as brushes, which are movable in grooves cut in the guide rails. Driven by the noted pairs of drive rollers, the brushes travel along the guide rails to brush away the dirt and dust.

Hygienically, this method of guide rail cleaning is preferable to the more conventional method of blasting the dust away by forced drafts of air, by virtue of less amounts of dust particles scattered into the plant atmosphere. The brushing go method has proved unsatisfactory, however, as it still scatters the dust into the air, though to lesser extent, and unnecessarily stains the neighboring parts of the machine.

Another objection to the brushing method is that the brushes must travel between the pairs of drive rollers. Squeezed hard by each pair of drive rollers, the brushes have been easy to wear out, very quickly becoming useless, incapable of scrubbing the groove bottoms.

SUMMARY OF THE INVENTION

It is among the objects of this invention to clean the guide rails and drive rollers of web-threading apparatus concurrently with web-threading, in such a manner that pollution of the plant atmosphere with dust particles is totally averted.

Another object of the invention is to clean the desired parts of the web-threading apparatus far more thoroughly, and far more effectively, than heretofore.

A further object of the invention is to preclude the slipping of the web leaders over the drive rollers, and the consequent slacking of the web, in the act of concurrent web threading and guide rail cleaning.

A still further object of the invention is to make the self-cleaning web-threading apparatus far more durable and trouble-free than heretofore.

Briefly, the present invention may be summarized as a self-cleaning web-threading apparatus for a web-fed printing press wherein a web of paper or like printable material is threaded through the press along any of a set of alternative web guideways for each specific printing job. The web-threading apparatus comprises guide rail means defining a web guideway along which a web is to be threaded by a web leader traveling in sliding engagement with the guide rail means. The web leader is fabricated at least in part from a detergent-absorbing material for sliding contact with the guide rail means. Disposed in any selected position or positions on the web guideway, detergent supply means supply, as by roller-coating or spraying, a detergent to the web leader traveling along the web guideway, thereby impregnating the web leader with the detergent.

Thus the guide rail means are cleaned by the detergent-impregnated web leader as the latter travels in sliding contact therewith. The guide rail cleaning by the web leader can be either concurrent with, or preliminary to, the threading of the web along the guideway.

In practice the web leader may take the form of an elongate, flexible baseplate covered on both sides with woven fabric. Experiment has proved that ink-stained guide rails can be cleaned far more efficaciously by detergent-impregnated fabric than by air-blasting or brushing. The detergent has also proved to serve the additional purpose of lubricating the web leader, enabling the same to travel over the guide rails with a minimum of friction, both when the guide rails are dust-laden and after they have been cleaned.

Threaded by the detergent-impregnated, smoothly traveling web leader, either after, or at the same time with, guide rail cleaning, the web of paper is not to develop slacks and so not to get caught by the neighboring machine parts. Web threading has thus become possible in shorter periods of time than heretofore.

The fabric covering the web leader, or any other detergent-absorbent material adoptable in its stead according to the invention, is not to become easily useless by being repeatedly caught by the drive rollers feeding the web leader along the web guideway. When itself stained, moreover, it may be detached from the web leader and cleaned for reuse.

The above and other objects, features and advantages of this invention will become more apparent, and the invention itself will best be understood, from a study of the following description and appended claims, with reference had to the attached drawings showing some preferred embodiments of the invention.

DESCRIPTION OF THE PREFERRED EMBODIMENTS

General

Figure 1:
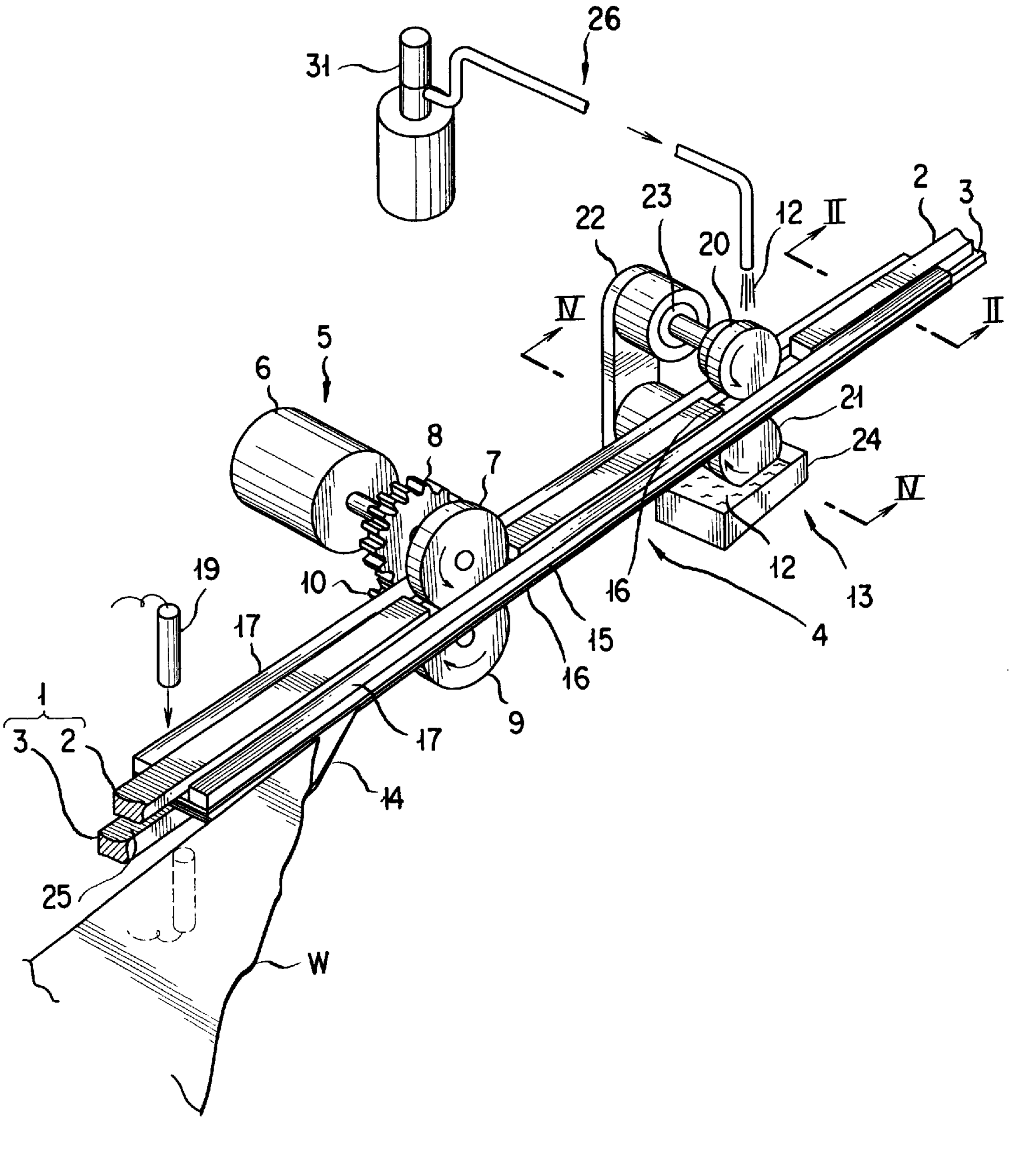
FIG. 1 is a perspective view, partly shown broken away for illustrative convenience, showing part of a web guideway together with a web leader threading a web of paper through the printing press, the web guideway and the web leader being equipped with self-cleaning means according to the novel concepts of this invention.

The present invention is illustrated in FIG. 1 as applied to web threading along a horizontal stretch of web guideway, it being understood, however, that the invention is just as well applicable to vertical, sloping, or curving guideways, as will become apparent from the additional embodiments of the invention to be disclosed subsequently.

The reference numeral 1 in FIG. 1 generally denotes the web guideway along which the web W is to be threaded on its way from the paper supply station to the folding station, both not shown. The web guideway 1 is constituted of two pairs, one shown, of guide rails 2 and 3 bracketed to the confronting inside walls of a pair of frame walls, not shown in FIG. 1, of the machine.

Capable of traveling in sliding engagement with each pair of guide rails 2 and 3 is a web leader 4 which coacts with another similar member to lead the web W along the guideway 1. Each web leader 4 is specially designed according to the novel concepts of this invention to serve the additional purpose of scrubbing and cleaning the guide rails 2 and 3, either concurrently with, or preliminary to, web threading. A series of web leader drive mechanisms, one seen at 5 in FIG. 1, are provided in spaced positions along the web guideway for driving each web leader 4 along the same.

Also disposed in selected positions along the web guideway 1 are detergent supply mechanisms such as one seen at 13 in FIG. 1. The detergent supply mechanisms 13 supply a detergent, shown at 12, to the pair of web leaders 4. By the term "detergent," as used herein and in the claims appended hereto, is meant any cleansing agent, preferably but not necessarily in liquid form, that is capable of making the guide rails clean of ink and other dirt. Impregnated with the detergent by the detergent supply mechanisms 13, the web leaders 4 are to clean the guide rails 2 and 3, as well as any other parts of the printing press that they may encounter, while traveling down the web guideway 1 with or without the web W.

Hereinafter in this specification the above noted web guideway 1, web leaders 4, web leader drive mechanisms 5, and detergent supply mechanisms 13 will be discussed in more detail, in that order and under separate headings. Comprehensive operational description will follow the discussion of the listed components.

Web Guideway

Figure 2:
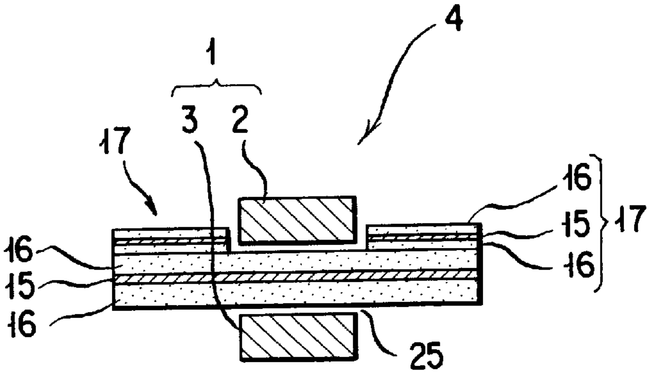
FIG. 2 is an enlarged cross section, taken along the line II—II in FIG. 1, through one pair of guide rails constituting the web guideway in combination with another such pair, the representative pair of guide rails being shown together with the web leader.

As drawn cross-sectionally and on a somewhat enlarged scale in FIG. 2, the web guideway 1 includes a pair of guide rails 2 and 3, each of rectangular cross-sectional shape, on either side of the web path. The guide rail 2 is shown placed over the other rail 3, with a spacing therebetween to receive one of the pair of web leaders 4. The spacing 25 between the guide rails 2 and 3 should be just enough to permit the web leader 4 to effectively scrub and clean the guide rail surfaces with a minimum of friction as the web leader travels along the guideway in the act of web threading.

A study of FIG. 1 will reveal that the guide rails 2 and 3 are both divided into longitudinal sections each less in length than the web leaders 4. The guide rail sections are longitudinally spaced one from another to accommodate not only parts of the web leader drive mechanisms 5, as has been known heretofore, but parts of the detergent supply mechanisms 13, as will be better understood from the subsequent detailed consideration of these mechanisms.

Web Leaders

The pair of web leaders 4, conjointly leading the web W along the web guideway 1, are of essentially like design, so that only one of them will be detailed with reference to FIGS. 1–3. The construction of the other web leader, which is not shown, is considered self-evident from the description of the representative web leader.

The representative web leader 4 is in the form of a relatively thin, flexible, elongate strip, with a thickness to be received between the pair of guide rails 2 and 3 with a working clearance, and a length greater than that of each section of the guide rails.

Being designed to serve not only as such but also as guide rail cleaner, the web leader 4 has layers of detergent-absorbent material 16 on both sides of a thin baseplate 15. The detergent-absorbent layers 16 should be capable of absorbing not only the detergent supplied by the detergent supply mechanisms 13 but the dirt scrubbed off the guide rail surfaces. They must also be wear-resistant and high in coefficient of friction. A preferred material that meets all these requirement is woven fabric. Other employable materials are nonwoven fabric, knitted fabric, and felt. Such detergent-absorbent layers may be formed on all or parts of the opposite surfaces of the baseplate 15.

Figure 3:
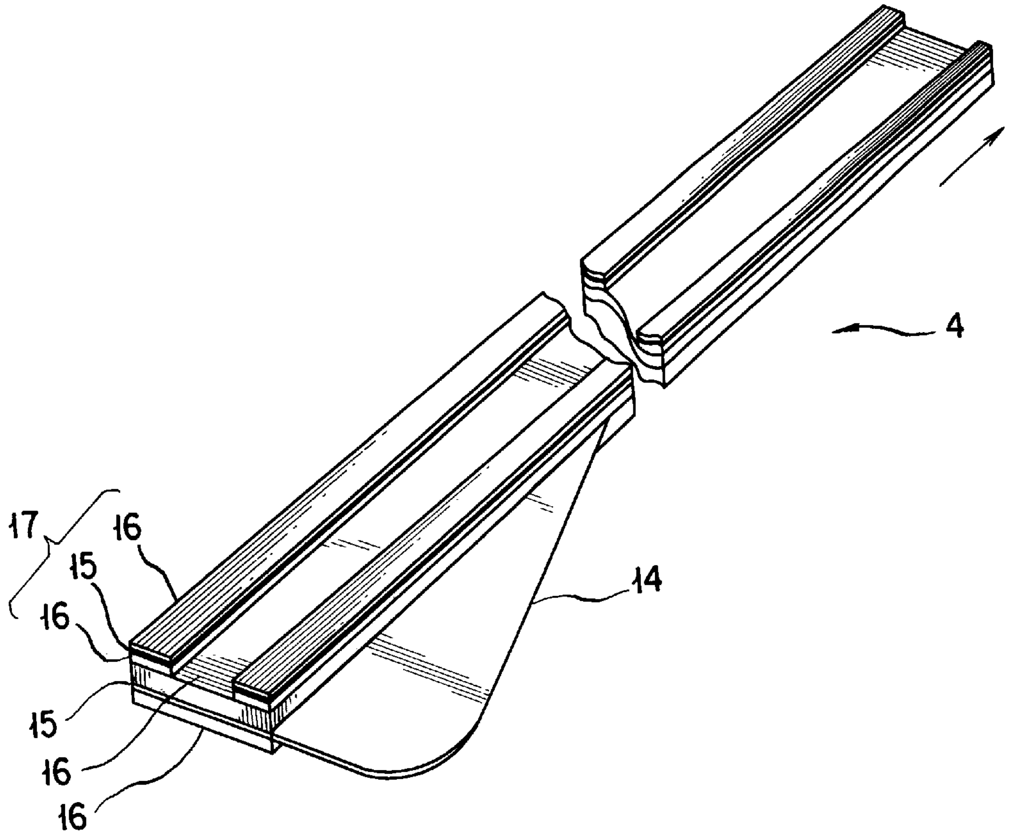
FIG. 3 is an enlarged perspective view, partly shown broken away for illustrative convenience, of the web leader.

FIG. 3 best reveals a tab or flap 14 of approximately triangular shape formed in one piece with the baseplate 15 and extending to a relatively short extent toward the other, unshown pair of guide rails. The web Wbeing threaded has its leading end portions pasted to the tabs 14 of the pair of web leaders 4.

As clearly seen in all of FIGS. 1–3, the web leader 4 is further provided with a pair of raised rims 17 formed longitudinally on its upper side, as seen in these figures, in order to prevent derailment of the web leader from the guide rails 2 and 3, although such rims could be formed on the underside of the web leader. To this end the pair of rims 17 are spaced from each other to receive the upper guide rail 2 therebetween with substantial clearance.

Preferably, each rim 17 should be of laminar construction similar to that of the web leader proper, having a baseplate 15 sandwiched between layers 16 of woven fabric or the like, for cleaning any surfaces that come into contact therewith. The rims 17 need not be formed all over the length of the web leader 4 as long as they serve the purpose of keeping the web leader in proper sliding engagement with the guide rails 2 and 3. Still further, solely for the purpose of derailment prevention, the rims 17 may be replaced by two rows of pins or studs, not shown, that are erected on either or both sides of the web leader 4 and on opposite sides of the guide rail 2 or 3.

Web Leader Drive Mechanisms

FIG. 1 shows at 5 one of any required number of web leader drive mechanisms of like construction that are disposed at more or less constant spacings along the web guideway 1. Each spacing should be less than the length of each web leader 4 in order that the web leader may be driven along the guideway by at least one of the drive mechanisms at any time.

The representative web leader drive mechanism 5 includes an electric drive motor 6 having both a frictional drive roller 7 and a drive gear 8 mounted to its output shaft. Disposed between two neighboring sections of the upper guide rail 2, the drive roller 7 is to make rolling engagement with the top surface of the web leader 4. Another frictional drive roller 9, driven by a driven gear 10 in mesh with the drive gear 8, is to make rolling contact with the bottom surface of the web leader 4.

Thus, upon rotation of the drive motor 6, the two frictional drive rollers 7 and 9 will rotate in opposite directions indicated by the arrows in FIG. 1. Caught between these drive rollers, the web leader 4 will be frictionally driven along the web guideway 1, from left to right as seen in FIG. 1. The web leader 4 will be caught between the drive rollers of the next drive mechanism before coming out of driven engagement with one drive mechanism, thereby traveling at constant speed all the way down the web guideway 1.

Detergent Supply Mechanisms

Any required number of detergent supply mechanisms may be provided in positions of vantage along the web guideway 1, such as, for example, just upstream of a printing station where the guide rails and neighboring parts are particularly subject to dirt accumulation. Since the web is threaded by a pair of web leaders, detergent supply mechanisms may be usually provided in pairs on both sides of the web guideway, each for supplying a detergent to one web leader.

Figure 4:
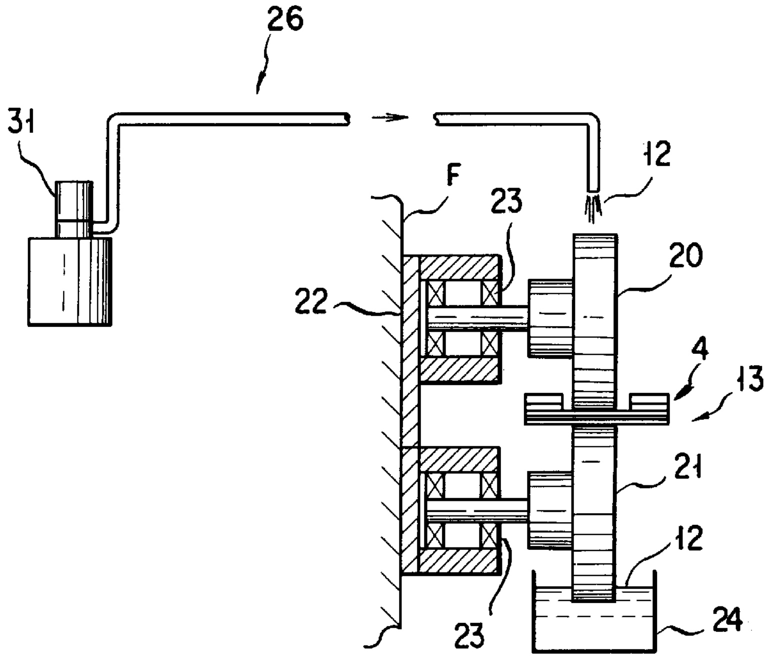
FIG. 4 is a diagrammatic sectional view of the detergent supply mechanism of FIG. 1, the section being taken along the line IV—IV in FIG. 1.

FIG. 1 shows one such detergent supply mechanism 13 as mounted in one selected position on the illustrated horizontal stretch of the web guideway 1, and FIG. 4 the same mechanism as sectioned along a plane at right angles with the web guideway. The detergent supply mechanism 13 is shown in these figures as adapted specifically for use on more or less horizontal parts of the web guideway. Other constructions are possible for use on more or less vertical parts, as disclosed in additional embodiments of the invention to be disclosed subsequently.

The particular detergent supply mechanism 13 of FIGS. 1 and 4 comprises a pair of damping rollers 20 and 21 which are received with clearances in the spacings between the sections of the guide rails 2 and 3 for rolling engagement with the opposite sides of the web leader 4. The damping rollers 20 and 21 are rotatably mounted to the frame wall F via a common mounting plate 22 and respective bearing assemblies 23. The spacing between the damping rollers 20 and 21 may be made somewhat less than the thickness of the web leader 4, so that the rollers may frictionally rotate with the travel of the web leader 4 and so effectively impregnate the web leader with the detergent 12.

In order to supply the detergent to the upper damping roll 20 there is employed in this particular embodiment a pump 31 which draws the detergent from a suitable receptacle for delivery to the upper damping roller via a conduit 26 terminating just above the roller. Issuing from the conduit 26, the detergent falls upon the circumference of the upper damping roll 20 thereby to be applied to the web leader 4.

The lower damping roll 21 is partly immersed directly in the detergent 12 filled in a pan 24. Revolving in frictional contact with the traveling web leader 4, the lower damping roll 21 has its circumference constantly wetted with the detergent and thus damps, in turn, the web leader with the detergent.

Preferably, and as shown at 19 in FIG. 1, a web leader sensor should be provided upstream of the detergent supply mechanism 13, with respect to the traveling direction of the web W being threaded, for detecting the approach of the web leader 4. The web leader sensor 19 is herein shown as a combination of a light source and a photodetector positioned opposite each other across the path of the web leader 4. The pump 31 is to be set into operation upon detection of the web leader 4 by the sensor 19, supplying the detergent to the upper damping roller 20 only when the web leader is traveling under that roller.

Operation

The paper roll installed in the paper supply station of the printing press is ready for threading when the web, unwound from the roll, has its tip pasted to the tabs 14 of the pair of web leaders 4. As the web leader drive mechanisms 5 are set into operation, the web leaders 4 will travel down the desired guideway 1 by being frictionally engaged between the drive rollers 7 and 9 of the successive drive mechanisms. Although the printing press is conventionally equipped with several alternative web guideways or guideway sections, it is understood that switching means are also conventionally provided for selectively interconnecting the desired guideway sections into a single streamlined whole along which the pair of web leaders may travel for web threading.

Web threading need not, however, be concurrent with guideway cleaning; that is, the pair of web leaders may be driven down the chosen guideway solely for the purpose of guideway cleaning, without having the web pasted thereto. For such preliminary guideway cleaning, the web leaders may either travel forwardly, from paper supply station to folding station, or reversely.

The reverse travel of the web leaders is accomplished by simple reversal of the rotational direction of the drive motors 6 of the web leader drive mechanisms 5. This method offers the advantage that the web leaders arrive at the paper supply station upon completion of guideway cleaning, ready for threading the web down the cleaned guideway. The web leaders may be held standing by adjacent the folding station for implementation of the preliminary cleaning method.

Let us assume, for the purposes of the ensuing description of operation, that the pair of web leaders 4 is now concurrently threading the web W and cleaning the guideway 1, just as pictured in FIG. 1. The web leaders 4, with the web W pasted to their tabs 14, will travel down the web guideway 1 by being frictionally engaged between the drive rollers 7 and 9, which are in rotation in opposite directions, of the successive web leader drive mechanisms 5.

On approaching each pair of detergent supply mechanisms 13, the web leaders 4 will be photoelectrically detected by the sensor 19. Thereupon, activated by the sensor output signal, the pump 31 of each detergent supply mechanism 13 will start drawing the detergent from its receptacle and forcing it out the conduit 26 onto the surface of the upper damping roll 20.

The pair of damping rollers 20 and 21 of each detergent supply mechanism 13 have both been out of rotation until one of the web leaders 4 is driven into the spacing therebetween, which is less than the thickness of the web leader. Both damping rollers will be frictionally set in rotation in opposite directions by the web leader 4 traveling therebetween.

Pumped onto the revolving upper damping roller 20 as above, the detergent 12 will impregnate the upper absorbent layer 16 of the web leader 4 as well as the absorbent layers of the raised rims 17 thereon. The lower damping roller 21, turning in partial immersion in the detergent 12 within the pan 24, will also impregnate the detergent into the bottom absorbent layer 16 of the web leader 4. The web leader 4 will be saturated with the detergent throughout its length on emerging from between the pair of damping rollers 20 and 21.

The detergent-impregnated web leader 4 will travel down the subsequent length of web guideway 1, scraping the surfaces of the guide rails 2 and 3 for clean of ink and other dirt accumulation. The pair of raised rims 17 of the web leader 4 will also serve the purpose of cleaning the opposite sides of the upper guide rail 2, in addition to that of holding the web leader on the web guideway. Scrubbed by the detergent-impregnated fabric, the guide rails 2 and 3 will be cleaned far more thoroughly by simple scrubbing or scraping, and with drastically less pollution of the plant air than by brushing.

The web leader 4 is so flexible, moreover, that it will effectively clean the guide rail surfaces even if they are curved sharply, as will be explained in some more detail in the following with reference to FIGS. 5 and 6.

Figure 5:
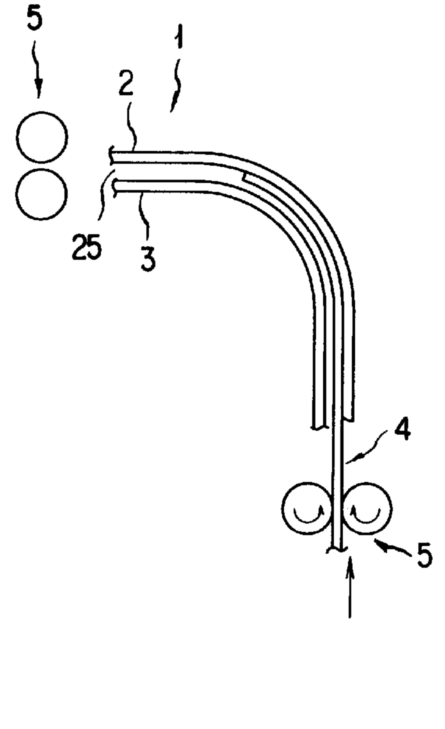
FIG. 5 is a diagrammatic illustration of how the web leader travels along a curve in the web guideway, the illustration being explanatory of the way the web leader cleans one of the pair of guide rails.
Figure 6:
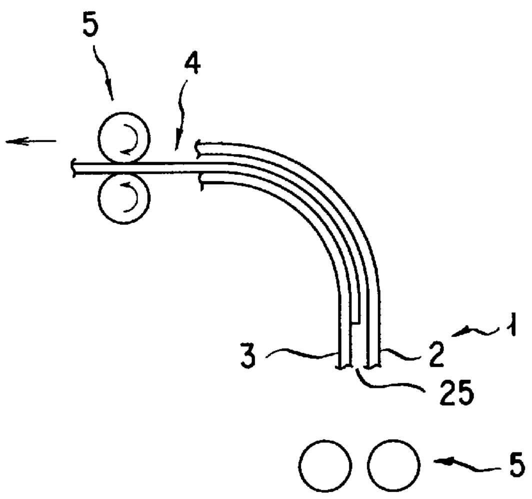
FIG. 6 is an illustration similar to FIG. 5 but explanatory of the way the web leader cleans the other of the pair of guide rails.

On entering a curve in the web guideway 1 as in FIG. 5 by being pushed by one web leader drive mechanism 5, the web leader 4 will first slide over the radially outer guide rail 2 thereby cleaning the same. Then, pulled by the next drive mechanism 5 as in FIG. 6, the web leader 4 will travel in sliding contact with the radially inside guide rail 3. Thus will both curving guide rails 2 and 3 be cleaned by the web leader 4.

As an additional advantage the layers 16 of detergent-impregnated fabric forming the opposite surfaces of the web leader 4, as well as of the raised rims 17, assure stable, slip-free travel of the web leader along the guideway 1. The web W is therefore not to develop slacks while being threaded by a pair of such web leaders 4, and hence not to be caught by the neighboring machine parts with the consequent possibility of breakage.

Alternate Detergent Supply Mechanism

Figure 7:
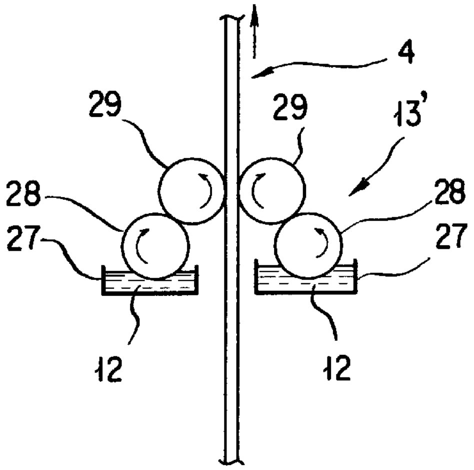
FIG. 7 is a diagrammatic illustration of another preferred form of detergent supply mechanism.

FIG. 7 shows a modified detergent supply mechanism 13' which is adapted for use on a vertical stretch of web guideway. It includes a pair of detergent-filled pans 27 mounted on both sides of the vertical web guideway. A pair of detergent supply rollers 28 are partly immersed in the detergent 12 in respective pans 27 and are in rolling contact with a pair of damping rollers 29, which in turn are in rolling contact with each other via the web leader 4.

As the pair of damping rollers 29 are frictionally turned in opposite directions by the web leader 4, so are the pair of supply rollers 28 in partial immersion in the detergent 12. The detergent 12 in the pans 27 is first applied to the supply rollers 28, thence to the damping rollers 29, and finally to the fabric layers 16, FIG. 2, on both sides of the web leader 4.

This alternative detergent supply mechanism gains the advantage of dispensing with any dedicated source of pressure such as the pump 31, FIG. 1, of the first disclosed embodiment.

Another Alternate Detergent Supply Mechanism

Figure 8:
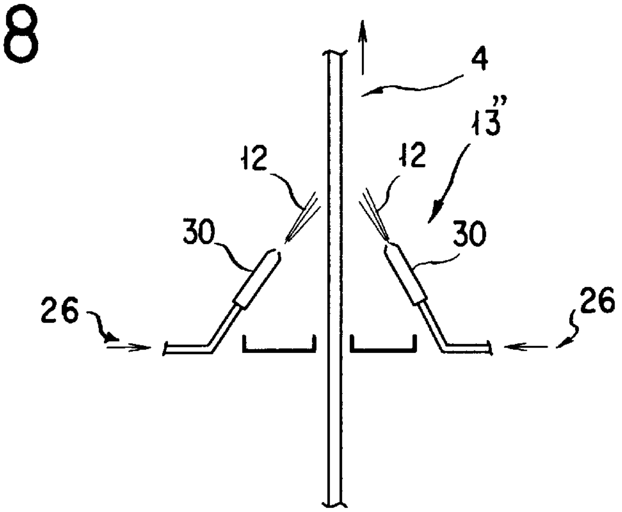
FIG. 8 is also a diagrammatic illustration of still another preferred form of detergent supply mechanism.

A pair of nozzles are employable as at 30 in FIG. 8 for spraying the detergent 12 to the opposite sides of the web leader 4 traveling vertically. The nozzles 30 are in communication with a source of the detergent under pressure such as the pump 31, FIG. 1. It is also understood that, as in the FIG. 1 embodiment, the pump is set into operation upon detection of the approaching web leader 4, so that the detergent is sprayed only when the web leader is traveling past this detergent supply mechanism 13".

Despite the foregoing detailed disclosure a variety of modifications and alterations of the illustrated embodiments will suggest themselves to one skilled in the art to conform to design preferences or to the requirements of each specific application of the invention. It is therefore appropriate that the invention be construed broadly and in a manner consistent with the fair meaning or proper scope of the claims which follow.

What is claimed is:

1. A self-cleaning web-threading apparatus for a web-fed printing press, wherein a web of paper or like printable material is threaded through the press along any of a set of alternative web guideways for each specific printing job, the web-threading apparatus comprising:

(a) guide rail means defining a web guideway along which a web is to be threaded through a printing press;

(b) a web leader capable of traveling along the web guideway in sliding engagement with the guide rail means for threading the web through the printing press, the web leader being fabricated at least in part from a detergent-absorbing material for sliding contact with the guide rail means;

(c) drive means for driving the web leader along the web guideway; and (d) detergent supply means disposed in a selected position on the web guideway for supplying a detergent to the web leader traveling along the web guideway in order to impregnate the same with the detergent;

(e) whereby the guide rail means are cleaned by the detergent-impregnated web leader as the latter travels in sliding contact therewith, either preliminary to, or concurrently with, the threading of the web along the guideway.

2. The self-cleaning web-threading apparatus of claim 1 wherein the web leader comprises:

(a) a baseplate; and (b) a pair of layers of detergent-absorbing material formed on both sides of the baseplate.

3. The self-cleaning web-threading apparatus of claim 2 wherein the detergent-absorbing material is fabric.

4. The self-cleaning web-threading apparatus of claim 1 wherein the web leader has a pair of raised rims formed thereon in order to be thereby held in sliding engagement with the guide rail means.

5. The self-cleaning web-threading apparatus of claim 4 wherein each raised rim of the web leader comprises:

(a) a baseplate; and (b) a pair of layers of detergent-absorbing material formed on both sides of the baseplate.

6. The self-cleaning web-threading apparatus of claim 1 wherein the guide rail means are divided into discrete longitudinal sections which are spaced from one another and wherein the detergent supply means comprises:

(a) a pair of damping rollers disposed on both sides of the web guideway and received in the spacings between the sections of the guide rail means, the pair of damping rollers being capable of frictional contact with opposite sides of the web leader thereby to be driven for rotation in opposite directions; and (b) means for applying the detergent to the surface of each damping roller.

7. The self-cleaning web-threading apparatus of claim 6 wherein the detergent-applying means comprises a pump.

8. The self-cleaning web-threading apparatus of claim 7 wherein the detergent-applying means further comprises a sensor for setting the pump in operation upon sensing the web leader.

9. The self-cleaning web-threading apparatus of claim 6 wherein the detergent-applying means comprises an open-top receptacle to be filled with the detergent for immersion of each damping roller.

10. The self-cleaning web-threading apparatus of claim 6 wherein the detergent-applying means comprises:

(a) an open-top receptacle to be filled with the detergent; and (b) a detergent supply roller in rolling contact with one of the damping rollers and adapted to be immersed in the detergent in the receptacle.

* * * * *